(12) United States Patent  
Morris (10) Patent No.: US 7,114,119 B1  
(45) Date of Patent: Sep. 26, 2006

(54) DETECTING AND CORRECTING ERRORS IN DATA

(75) Inventor: J. Mark Morris, Poway, CA (US)

(73) Assignee: NCR Corp., Dayton, OH (US)

(*) Notice: Subject to any disclaimer, the term of this patent is extended or adjusted under 35 U.S.C. 154(b) by 457 days.

(21) Appl. No.: 10/125,888

(22) Filed: Apr. 19, 2002

(51) Int. Cl.
*G11C 29/00* (2006.01)
*G06F 12/00* (2006.01)

(52) U.S. Cl. .................................. 714/766; 711/114

(58) Field of Classification Search ............... 714/718, 714/719, 47, 48, 52, 54, 807, 766; 711/714
See application file for complete search history.

(56) References Cited

U.S. PATENT DOCUMENTS 6,687,791 B1 * 2/2004 Morrison .................. 711/130
6,907,466 B1 * 6/2005 Alexander et al. ........ 709/232

* cited by examiner

*Primary Examiner*—James C. Kerveros
(74) *Attorney, Agent, or Firm*—John D. Cowart (57) ABSTRACT

Detecting data corruption includes receiving one or more blocks of data to be written to a storage device, selecting a portion of the data in the blocks (e.g., one or more bytes or data words), applying a rule to derive information characterizing the selected portion of data (e.g., calculating a checksum for the for the portions of data selected from the block to be written), and storing this information. After the data has been written to the storage device, the store information is used in deciding whether the data has been corrupted.

31 Claims, 5 Drawing Sheets

DETECTING AND CORRECTING ERRORS IN DATA

BACKGROUND

Computer systems are often subject to data-corruption, both during storage to disk (or some other storage device) and during transmission between computers or devices within a computer. Myriad techniques have been developed to battle data-corruption and to ensure data integrity. Error-correction coding (ECC) and parity schemes, for example, are used routinely in detecting and correcting errors that appear, both during storage and transmission, in individual bits and bytes of data.

Even with these data-integrity schemes, however, corruption occasionally occurs in larger chunks of data on storage disks, such as disk blocks that often include hundreds or even thousands of bytes of data. Sources of such corruption include bad disk reads and writes caused by hardware or firmware errors, disk writes delivered to the wrong storage locations, and data loss during read and write operations. Data-corruption of this nature occurs very infrequently, but it can have devastating effects when it does occur.

SUMMARY

Described here are techniques for detecting and correcting errors that occur in large blocks of data. The techniques are, in some cases, applied to every disk I/O operation so that the computer system discovers any corruption, regardless of when it occurs or where it occurs (e.g., data path, media). The techniques often act on very small amounts of data, e.g., one data word per data block, so they have little impact on system performance. Nevertheless, these techniques are very successful (almost 100% in some systems) in detecting data errors.

Detecting data-corruption includes receiving one or more blocks of data to be written to a storage device, selecting a portion of the data in the blocks (e.g., one or more bytes or data words), applying a rule to derive information characterizing the selected portion of data (e.g., calculating a checksum for the portions of data selected from the block to be written), and storing this information. After the data has been written to the storage device, the stored information is used in deciding whether the data has been corrupted. One technique for doing so includes reading the selected portion of data from the storage device, again applying the rule to derive information characterizing the selected portion of data as read from the storage device, assessing whether the stored information matches the information derived from the data as read from the storage device, and, if not, concluding that the data has been corrupted.

Correcting data-corruption includes receiving a request to read data from a storage device, reading the requested data from the storage device, and applying a rule to assess whether the data has been corrupted. If corruption has occurred, a duplicate copy of the requested data is read from another storage device and then delivered to the requesting device. In some embodiments, data-corruption occurring on the storage device itself is corrected by writing the duplicate copy of data over the corrupted data.

Other features and advantages will become apparent from the description and claims that follow.

DETAILED DESCRIPTION

Figure 1:
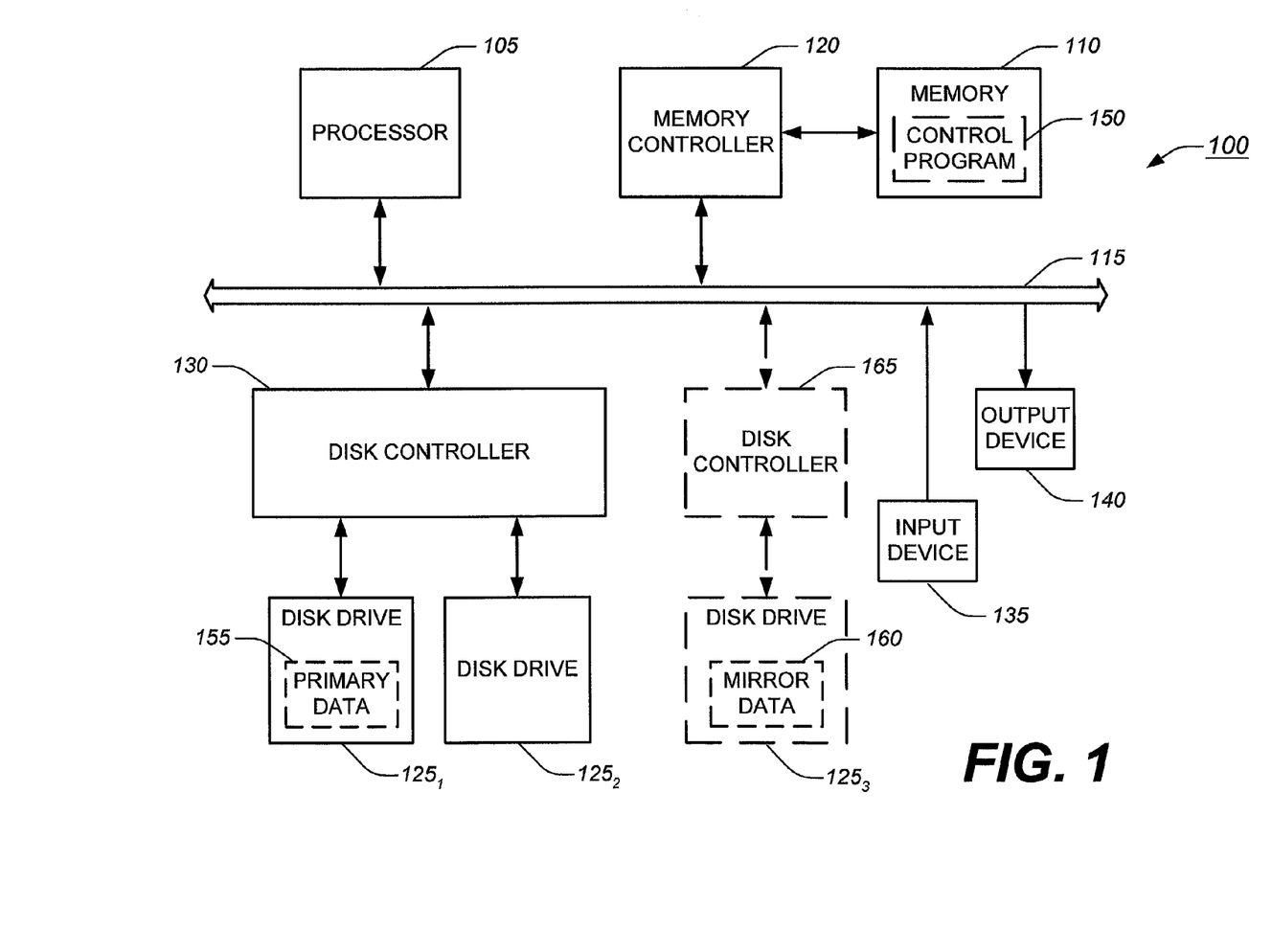
FIG. 1 is a block diagram of a computer system with data-integrity-checking capability.

FIG. 1 shows a computer system 100 that detects and corrects errors occurring in stored data. The system 100 includes one or more processors 105 that receive data and program instructions from a temporary data-storage device, such as a memory device 110, over a communications bus 115. A memory controller 120 governs the flow of data into and out of the memory device 115. The system 100 also includes one or more persistent data-storage devices, such as disk drives $125_1$, $125_2$, that store chunks of data in a manner prescribed by one or more disk controllers 130. One or more input devices 135, such as a mouse and a keyboard, and output devices 140, such as a monitor and a printer, allow the computer system to interact with a human user and with other computers.

The system also includes a control program 150 that typically resides on one of the disk drives and then is loaded into memory at run-time. Like control programs in conventional computer systems, the control program 150 here contains instructions (or "program code") that, when executed by the processor, allow the computer system to carry out operations on the data stored on the disk drives. Unlike other control programs, however, this program includes code that allows the computer to detect errors occurring in blocks of data on the disk drives and, in some cases, to correct those errors when carrying out I/O operations involving that data.

As described in more detail below, the processor, in executing the control program 150, selects a sample of data from each disk block involved in an I/O operation and, using that data, decides whether the block as a whole has suffered any corruption. In some embodiments, the computer system stores at least two copies of the data—a "primary" copy 155 on one disk drive $125_1$, and a "secondary" or "mirror" copy 160 on another disk drive 1253. Storing a mirror copy in this manner allows the processor to correct errors found in the primary data. A disk controller 165 other than the one that manages the primary data typically manages the disk drive $125_3$ on which the mirror data resides. This ensures that errors occurring in the primary data as a result of a controller malfunction do not also appear in the mirror data.

Figure 2:
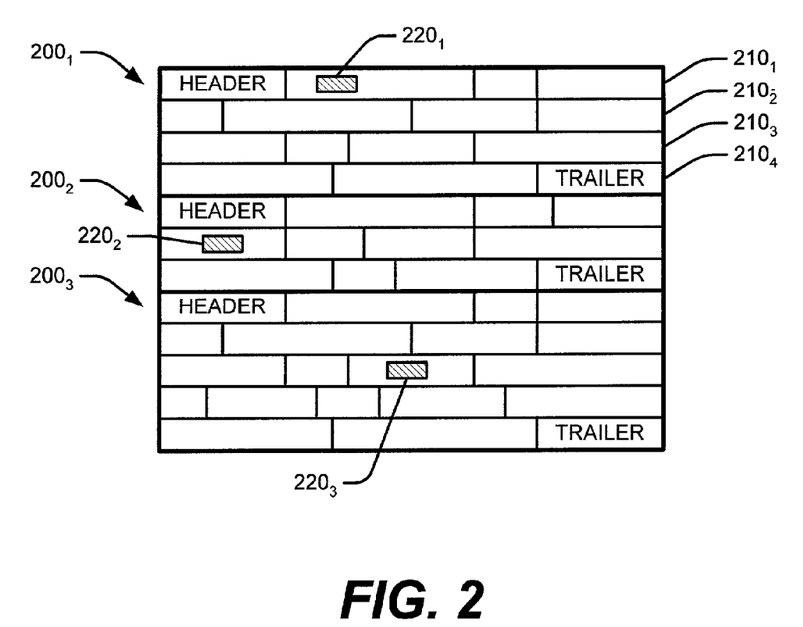
FIG. 2 is a diagram of several blocks of data for which data-integrity checking is performed.

FIG. 2 shows several data blocks $200_{1\ldots3}$ stored on a disk drive. Each of the blocks shown here includes several data segments $210_{1\ldots4}$ of equal length (e.g., 512 bytes per segment). The blocks do not necessarily include an equal number of segments.

The computer system monitors the disk blocks for data-corruption by selecting a sample $220_{1\ldots3}$ of the data in each block, e.g., one data word (four bytes in a 32-bit machine), and watching for unexpected changes in that data sample. The computer identifies and inspects the sample of data to be monitored when it first writes the block to the disk drive. The computer then inspects that portion of data on each subsequent disk read operation that involves that data. If the data (or some characteristic of the data, such as a checksum value) has changed since it was last inspected, then the computer knows that the corruption has occurred.

For example, the computer system, in storing the first block $200_1$ in FIG. 2 to disk, might read a sample $220_1$ of the data in that block and store that data apart from the block itself, perhaps on another disk drive or in a designated place in memory. In handling the data block during a subsequent read operation, the control program again reads the data sample $220_1$ and compares its value to that stored previously. Each time the computer system overwrites the block of data on disk, it updates the value of the data sample. In some embodiments, instead of storing the actual data contained in the data sample $220_1$, the control program inspects some characteristic of the data—e.g., the checksum of the individual bytes that make up the sample—and stores that information for comparison later.

Some computer systems read and write groups of data blocks together during all I/O operations. For example, some systems write and read all three of the data blocks in FIG. 2 together during all I/O operations, even when the requesting device needs only a portion of the data contained in those blocks. Grouping data blocks in this manner provides efficiencies that some system designers seek.

In systems such as these, the control program gains efficiency by performing a single data-integrity-checking routine on all of the blocks together. For example, when the computer system first writes the three data blocks $200_{1\ldots3}$ to disk, the control program might read a selected data word $220_{1\ldots3}$ from each of the three blocks and perform a checksum calculation on these three words. The control program then stores the checksum value to a designated place for use in checking the integrity of the data in the three blocks during subsequent I/O operations.

In this manner, the computer system is able to use a single piece of data, one data word in length, to monitor the integrity of multiple blocks of data. While such a technique does not guarantee that the computer system will detect all errors occurring in the data, the chances are very slight that an error will go undetected. For a 32-bit system in which data storage and data-corruption occur randomly and for which the system samples a single data word for each block of data, the odds that the checksum will erroneously match a corrupted sector of data are 1 in $2^{32}$ (i.e., 1 in 4,294,967,296). For a 64-bit system, the odds are 1 in $2^{64}$. While data storage and corruption are not entirely random in most systems, it is clear that the checksum matches for good and corrupt data will occur very rarely.

Figure 3:
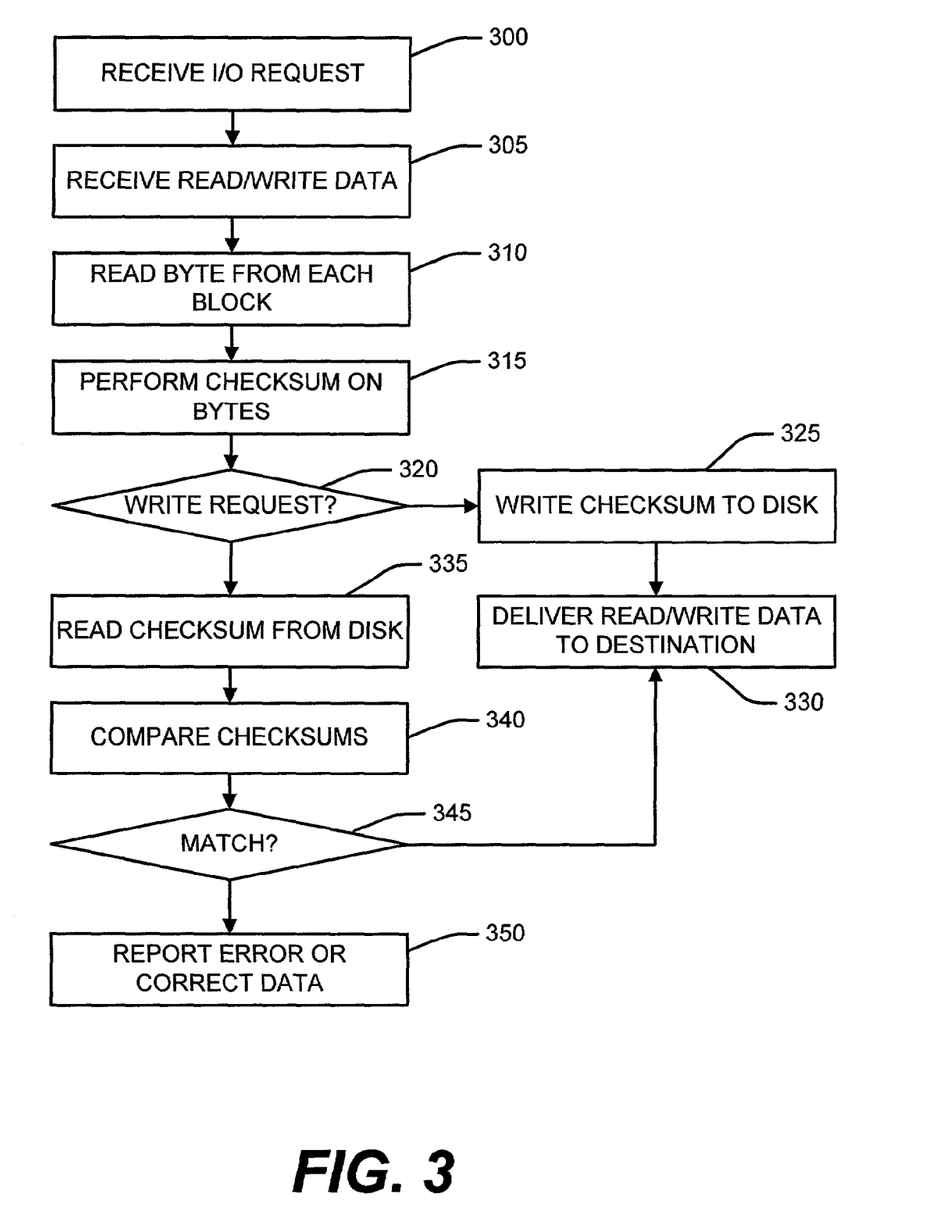
FIG. 3 is a flow chart of a technique for checking the integrity of blocks of data.

FIG. 3 shows an example of one technique by which a computer system, through a control program, monitors the integrity of large chunks of data stored to disk. Upon receiving an I/O request from a requesting device (step 300), the system either receives several blocks of data from the requesting device (in the case of a write request) or retrieves several blocks of data from storage (in the case of a read request) (step 305). The system reads a selected portion (e.g., one or more bytes or words) of the data in each block (step 310) and performs a checksum calculation on the data samples (step 315).

If the system has received a request to write data to disk (step 320), it writes the checksum value to a selected location (step 325) and then delivers the data blocks to the appropriate location on disk (step 330). For a read operation involving those blocks of data, the system retrieves the stored checksum value (step 335) and compares it to the newly calculated value for the data read from disk (step 340). When the system sees that the checksum values match (step 345), it assumes that no errors have occurred in the data read from disk and delivers the data to the requesting device (step 330). If the checksum values do not match, the system reports the errors and/or corrects the corrupted data (step 350).

Figure 4:
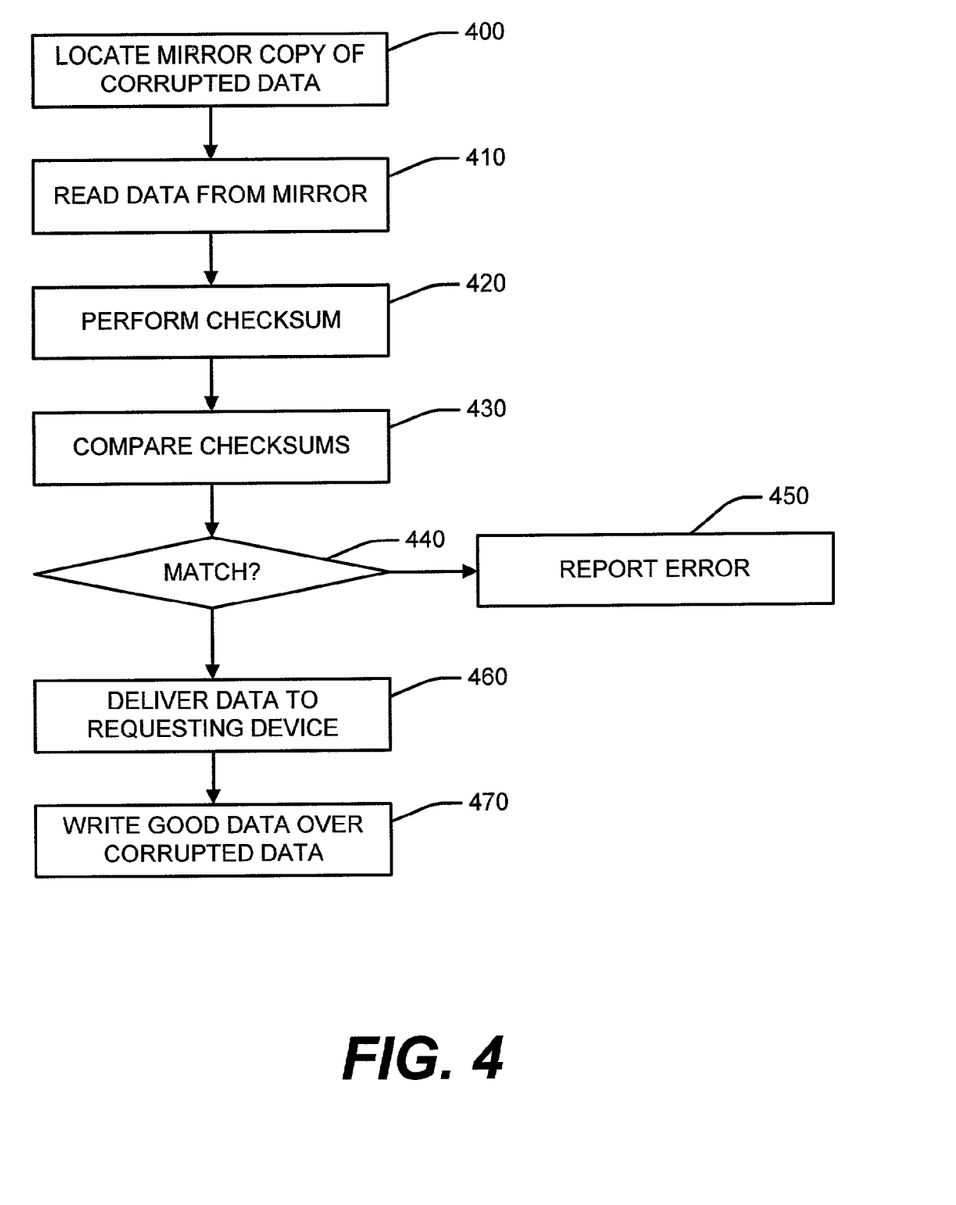
FIG. 4 is a flow chart of a technique for correcting errors in large blocks of data.

FIG. 4 shows an example of one technique by which the computer system corrects errors occurring in stored data. Upon detecting data-corruption (see FIG. 3), the system identifies the storage location of a mirror copy of the corrupted data (step 400). The system reads the mirror data from disk (step 410) and performs a checksum calculation on selected portions of the mirror data (step 420). The system then compares the checksum value for the mirror data to the checksum value stored when the data was originally written to disk (step 430) and decides whether the two values match (step 440). If the values do not match, the system assumes that corruption has also occurred in the mirror data or in the stored checksum value and reports an error (step 450). Some systems will assume that the data is good if the checksum value for the mirror data matches the checksum calculated for the primary data, even when the stored checksum value matches neither.

If the stored checksum value matches the checksum for the mirror data, the computer assumes that the mirror data is good and delivers the mirror data to the requesting device (step 460). The system corrects the errors in the primary data by writing the mirror data over the primary data on the primary disk (step 470).

Figure 5:
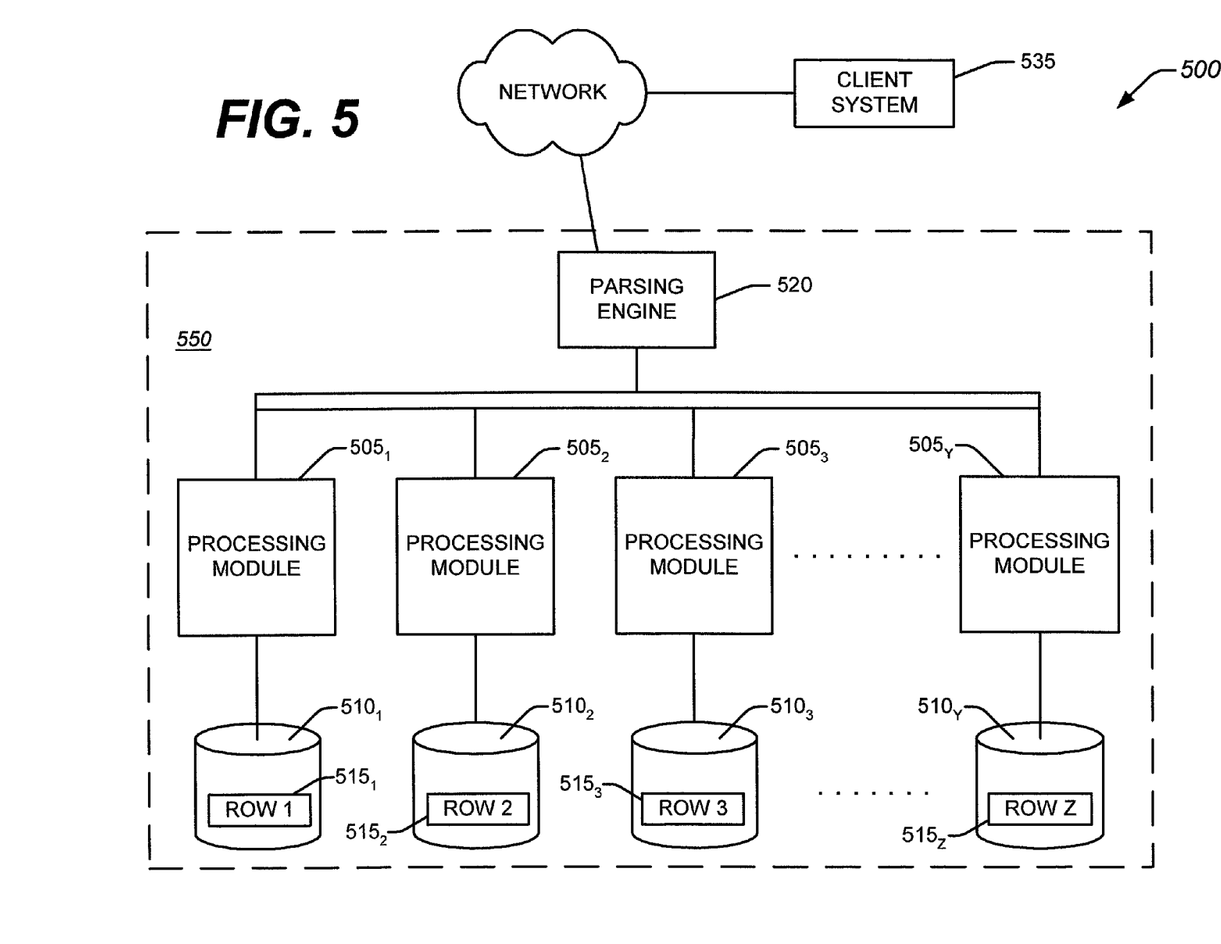
FIG. 5 is a block diagram of a large computer system that uses these data-error detection and correction techniques.

FIG. 5 shows one type of computer system in which these data-error detection and correction techniques are particularly useful. The computer system is a data-warehousing system 500, such as a TERADATA data-warehousing system sold by NCR Corporation, in which vast amounts of data are stored on many disk-storage facilities that are managed by many processing units. In this example, the data-warehouse 500 includes a relational database management system (RDBMS) built upon a massively parallel processing (MPP) platform. Other types of database systems, such as object-relational database management systems (ORDBMS) or those built on symmetric multi-processing (SMP) platforms, are also suited for use here.

As shown here, the data warehouse 500 includes one or more processing modules $505_{1\ldots Y}$ that manage the storage and retrieval of data in data-storage facilities $510_{1\ldots Y}$. Each of the processing modules $505_{1\ldots Y}$ manages a portion of a database that is stored in a corresponding one of the data-storage facilities $510_{1\ldots Y}$. Each of the data-storage facilities $510_{1\ldots Y}$ includes one or more disk drives.

The system stores customer and transaction data in one or more tables in the data-storage facilities $510_{1\ldots Y}$. The rows $515_{1\ldots Z}$ of the tables are stored across multiple data-storage facilities $510_{1\ldots Y}$ to ensure that the system workload is distributed evenly across the processing modules $505_{1\ldots Y}$. In a Teradata system, each row is stored within one or more sectors of data, each no more than 512 bytes in length. The system writes data to and reads data from disk in blocks that are one to 255 sectors in length. In most systems, each row of data is stored on at least two data-storage facilities to ensure data redundancy.

A parsing engine 520 organizes the storage of data and the distribution of table rows $515_{1\ldots Z}$ among the processing modules $505_{1\ldots Y}$. The parsing engine 520 also coordinates the retrieval of data from the data-storage facilities $510_{1\ldots Y}$ in response to queries received from a user at a mainframe 530 or a client computer 535. The data warehouse usually receives queries in a standard format, such as the Structured Query Language (SQL) put forth by the American National Standards Institute (ANSI).

The text above describes one or more specific embodiments of a broader invention. The invention also is carried out in a variety of alternative embodiments and thus is not limited to those described here. Those other embodiments are also within the scope of the following claims.

I claim:

1. A method for use in detecting corruption in data written to a storage device, the method comprising:
    receiving one or more blocks of data to be written to the storage device;
    selecting from at least one of the blocks only a portion of the data in the block;
    applying a rule to derive information characterizing the selected portion of data;
    storing this information; and
    after the data has been written to the storage device, using the stored information in deciding whether the data has been corrupted.

2. The method of claim 1, where using the stored information in deciding whether the data has been corrupted includes:
    reading the selected portion of data from the storage device;
    again applying the rule to derive information characterizing the selected portion of data as read from the storage device;
    assessing whether the stored information matches the information derived from the data as read from the storage device; and
    if the two pieces of information do not match, concluding that the data has been corrupted.

3. The method of claim 1, where selecting a portion of the data includes selecting a portion of the data in each block to be written during a write operation.

4. The method of claim 3, where applying a rule to derive information includes calculating a checksum of the data selected from more than one of the blocks.

5. The method of claim 1, where applying a rule to derive information includes calculating a checksum for the selected portion of data.

6. The method of claim 1, where applying a rule to derive information includes reading the contents of the selected portion of data.

7. The method of claim 1, where the selected portion of data includes a single byte of data.

8. The method of claim 1, where the selected portion of data includes multiple bytes of data.

9. The method of claim 1, where the selected portion of data includes a single word of data.

10. The method of claim 1, where the selected portion of data includes multiple words of data.

11. A computer system comprising:
    a storage device; and
    a data-integrity component configured to:
        receive one or more blocks of data to be written to the storage device;
        select from at least one of the blocks only a portion of the data in the block;
        apply a rule to derive information characterizing the selected portion of data;
        effect storage of the information; and
        after the data has been written to the storage device, use the stored information in deciding whether the data has been corrupted.

12. The system of claim 11, where the data-integrity component, in using the stored information in deciding whether the data has been corrupted, is configured to:
    read the selected portion of data from the storage device;
    again apply the rule to derive information characterizing the selected portion of data as read from the storage device;
    assess whether the stored information matches the information derived from the data as read from the storage device; and
    if the two pieces of information do not match, conclude that the data has been corrupted.

13. The system of claim 11, where the data-integrity component, in selecting a portion of the data, is configured to select a portion of the data in each block to be written during a write operation.

14. The system of claim 13, where the data-integrity component, in applying a rule to derive information, is configured to calculate a checksum of the data selected from more than one of the blocks.

15. The system of claim 11, where the data-integrity component, in applying a rule to derive information, is configured to calculate a checksum for the selected portion of data.

16. The system of claim 11, where the data-integrity component, in applying a nile to derive information, is configured to read the contents of the selected portion of data.

17. An article comprising at least one computer-readable storage medium containing program code that, when executed by a computer, causes the computer to:
    receive one or more blocks of data to be written to the storage device;
    select from at least one of the blocks only a portion of the data in the block;
    apply a rule to derive information characterizing the selected portion of data;
    effect storage of the information; and
    after the data has been written to the storage device, use the stored information in deciding whether the data has been corrupted.

18. The article of claim 17, where, in using the stored information in deciding whether the data has been corrupted, the computer is configured to:
    read the selected portion of data from the storage device;
    again apply the rule to derive information characterizing the selected portion of data as read from the storage device;
    assess whether the stored information matches the information derived from the data as read from the storage device; and
    if the two pieces of information do not match, conclude that the data has been corrupted.

19. The article of claim 17, where, in selecting a portion of the data, the computer is configured to select a portion of the data in each block to be written during a write operation.

20. The article of claim 19, where, in applying a rule to derive information, the computer is configured to calculate a checksum of the data selected from more than one of the blocks.

21. The article of claim 17, where, in applying a rule to derive information, the computer is configured to calculate a checksum for the selected portion of data.

22. The article of claim 17, where, in applying a rule to derive information, the computer is configured to read the contents of the selected portion of data.

23. A method for use in correcting corruption found in data written to a storage device, the method comprising:
- receiving a request to read data from the storage device;
- reading the requested data from the storage device;
- applying a rule to assess whether the data has been corrupted; and
- if corruption has occurred:
  - reading a duplicate copy of the requested data from another storage device; and
  - delivering the duplicate copy of the requested data to the requesting device.

24. The method of claim 23, also comprising writing the duplicate copy of data over the corrupted data on the storage device.

25. A computer system comprising:
- a first storage device on which data is stored;
- a second storage device that stores a duplicate copy of at least some of the data stored on the first storage device; and
- a data-integrity component configured to:
  - receive a request to read certain data from the first storage device;
  - read the requested data from the first storage device;
  - apply a rule to assess whether the data has been corrupted; and
  - if corruption has occurred:
    - read a duplicate copy of the requested data from the second storage device; and
    - deliver the duplicate copy of the requested data to the requesting device.

26. The system of claim 25, where the data-integrity component is also configured to write the duplicate copy of data over the corrupted data on the first storage device.

27. An article comprising at least one computer-readable storage medium containing program code that, when executed by a computer, causes the computer to:
- receive a request to read data from the storage device;
- read the requested data from the storage device;
- apply a rule to assess whether the data has been corrupted; and
- if corruption has occurred:
  - read a duplicate copy of the requested data from another storage device; and
  - deliver the duplicate copy of the requested data to the requesting device.

28. The article of claim 27, where the program code also causes the computer to write the duplicate copy of data over the corrupted data on the storage device.

29. A method for use in detecting and correcting corruption in data written to a storage device, the method comprising:
- receiving one or more blocks of data to be written to the storage device;
- selecting a portion of the data in the blocks;
- applying a rule to derive information characterizing the selected portion of data;
- storing this information; and
- after the data has been written to the storage device:
  - receiving a request to read the data from the storage device;
  - reading the requested data;
  - using the stored information in deciding whether the data has been corrupted; and
  - if corruption has occurred:
    - reading a duplicate copy of the requested data from another storage device; and
    - delivering the duplicate copy of the requested data to the requesting device.

30. The method of claim 29, where using the stored information in deciding whether the data has been corrupted includes:
- reading the selected portion of data from the storage device;
- again applying the nile to derive information characterizing the selected portion of data as read from the storage device;
- assessing whether the stored information matches the information derived from the data as read from the storage device; and
- if the two pieces of information do not match, concluding that the data has been corrupted.

31. The method of claim 29, also comprising writing the duplicate copy of data over the corrupted data on the storage device.

* * * * *

UNITED STATES PATENT AND TRADEMARK OFFICE
CERTIFICATE OF CORRECTION

| | | |
|---|---|---|
| PATENT NO. | : 7,114,119 B1 | Page 1 of 1 |
| APPLICATION NO. | : 10/125888 | |
| DATED | : September 26, 2006 | |
| INVENTOR(S) | : J. Mark Morris | |

It is certified that error appears in the above-identified patent and that said Letters Patent is hereby corrected as shown below:

Column 6, Line 26, after "a" delete "nile" and insert --rule--

Signed and Sealed this

Twentieth Day of November, 2007

JON W. DUDAS
*Director of the United States Patent and Trademark Office*